United States Patent
Pokora

(10) Patent No.: US 11,450,918 B2
(45) Date of Patent: Sep. 20, 2022

(54) BATTERY MODULE GAS SENSOR FOR BATTERY CELL MONITORING

(71) Applicant: Rivian IP Holdings, LLC, Plymouth, MI (US)

(72) Inventor: Mark Pokora, San Clemente, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 16/796,222

(22) Filed: Feb. 20, 2020

(65) Prior Publication Data

US 2020/0266405 A1    Aug. 20, 2020

Related U.S. Application Data

(60) Provisional application No. 62/808,220, filed on Feb. 20, 2019.

(51) Int. Cl.
*H01M 10/613* (2014.01)
*H01M 50/342* (2021.01)
(Continued)

(52) U.S. Cl.
CPC ....... *H01M 50/342* (2021.01); *H01M 10/482* (2013.01); *H01M 10/486* (2013.01);
(Continued)

(58) Field of Classification Search
CPC ............. H01M 10/486; H01M 10/613; H01M 10/482; H01M 50/342; H01M 50/317; H01M 2010/4271
See application file for complete search history.

(56) References Cited

U.S. PATENT DOCUMENTS 6,204,769 B1  3/2001 Arai
2007/0229294 A1  10/2007 Vossmeyer
(Continued)

FOREIGN PATENT DOCUMENTS

CN  205122719  3/2016
CN  108806180  11/2018
(Continued)

OTHER PUBLICATIONS

CN 109316687A. Feb. 12, 2019. English translation (Year: 2019).*
International Search Report and Written Opinion in PCT/US2020/019067 dated May 19, 2020.

*Primary Examiner* — James Lee
(74) *Attorney, Agent, or Firm* — Haley Guiliano LLP

(57) ABSTRACT

Battery monitoring systems and methods are provided. The battery monitoring system may include a battery module and battery management circuitry. The battery module comprises battery cells and a gas sensor configured to detect the presence of gas within the battery module. The battery management circuitry is configured to receive a sensor signal from the gas sensor, determine whether the sensor signal indicates the presence of gas within the battery module, and in response to determining that the sensor signal indicates the presence of gas, take an action. The action may include increasing cooling to the battery cells, limiting a maximum load that can be applied to the battery module, disconnecting the battery module, or providing a warning. The battery module may also include a component that was doped with a chemical that begins to off-gas above an activation temperature. The gas sensor may be configured to detect the chemical.

22 Claims, 3 Drawing Sheets

(51) Int. Cl.
    *H01M 10/48*     (2006.01)
    *H01M 50/317*    (2021.01)
    *H01M 10/42*     (2006.01)

(52) U.S. Cl.
    CPC ....... *H01M 10/613* (2015.04); *H01M 50/317* (2021.01); *H01M 2010/4271* (2013.01)

(56) References Cited

U.S. PATENT DOCUMENTS

| | | |
|---|---|---|
| 2011/0059341 A1 | 3/2011 | Matsumoto |
| 2017/0098806 A1* | 4/2017 | Bowersock ............ H01G 11/66 |

FOREIGN PATENT DOCUMENTS

| | | |
|---|---|---|
| CN | 109316687 | 2/2019 |
| JP | H11-164401 | 6/1999 |
| JP | 2000-188135 | 7/2000 |
| JP | 2001-25173 | 1/2001 |
| JP | 2008-235171 | 10/2008 |
| JP | 2009-303364 | 12/2009 |
| KR | 100670442 | 1/2007 |

* cited by examiner

BATTERY MODULE GAS SENSOR FOR BATTERY CELL MONITORING

CROSS REFERENCE TO RELATED APPLICATION

This disclosure claims the benefit of U.S. Provisional Application No. 62/808,220, filed Feb. 20, 2019, which is hereby incorporated by reference herein in its entirety.

SUMMARY

Battery modules having multiple battery cells are used in a variety of applications. For example, electric vehicles can use battery modules having a large number of battery cells (e.g., hundreds or thousands of battery cells per module). It is important that battery modules are not operated outside of their safe operating regions. When a battery cell, such as a lithium ion battery cell, is operated above its safe operating temperature, damage can occur. As the temperature rises, pressure can build up in the battery cell. For example, electrolyte gel inside of the battery cell can begin to bubble or generate steam, which causes the pressure inside of the battery cell to increase. Battery cells typically have a vent that allows gas or liquid to escape when pressure increases beyond the actuation pressure of the vent. It is desirable to prevent battery cells from reaching ventilation. In addition, if the temperature inside of a battery cell continues to increase, a thermal runaway event can occur. It is also desirable to prevent a thermal runaway event.

Battery management systems are used to monitor the operation of battery modules to ensure that they are operated within a safe operating region. One way of monitoring the temperature of a battery cell is to use a temperature sensor such as a thermistor or thermocouple. When a battery module contains multiple battery cells, multiple temperature sensor may be needed to sufficiently monitor the temperature of the battery cells. In some systems, the thermal properties of a battery module are modeled and the model can be used to reduce the number of temperature sensors. However, such systems may not be able to detect a localized temperature increase in time to prevent damage to one or more battery cells. Accordingly, it is desirable to identify a localized increase in temperature inside of a battery module. It is also desirable to identify a localized increase in temperature without using a temperature sensor for each battery cell. It is also desirable to predict and prevent a potential battery cell ventilation. It is also desirable to detect the occurrence of a battery cell ventilation. It is also desirable to predict and prevent a thermal runaway event. In accordance with some embodiments of the present disclosure, one or more gas sensors are used in a battery module to provide improved monitoring of the battery module.

In some embodiment, the battery monitoring system of the present disclosure may include a battery module and battery management circuitry. The battery module comprises a plurality of battery cells and a gas sensor configured to detect the presence of gas within the battery module. The battery management circuitry is configured to receive a sensor signal from the gas sensor, determine whether the sensor signal indicates the presence of gas within the battery module, and in response to determining that the sensor signal indicates the presence of gas, take an action.

In some embodiments, the action comprises using a battery cooling system to provide increased cooling to the plurality of battery cells. In some embodiments, the action comprises limiting a maximum load that can be applied to the battery module. In some embodiments, the action comprises disconnecting the battery module from a load. In some embodiments, the action comprises using a user interface to provide a warning.

In some embodiments, the battery module comprises a component that was doped with a chemical. When the temperature of the component increases above an activation temperature, the component begins to off-gas the chemical. In some embodiments, the gas sensor is configured to detect the chemical. In some embodiments, the component comprises an adhesive used to secure the plurality of battery cells in the battery module.

In some embodiments, the battery module comprises a first and second gas sensor, where the first gas sensor is configured to detect at least one chemical that is indicative of overheating of a battery cell and the second gas sensor is configured to detect at least one chemical that is indicative of battery cell ventilation.

In some embodiments, the battery module comprises a first and second gas sensor, where the first gas sensor is configured to detect at least one chemical that is indicative of battery cell ventilation and the second gas sensor is configured to detect at least one chemical that is indicative of a battery cell thermal runaway event.

In some embodiments, the battery management circuitry is configured to determine whether the sensor signal indicates the presence of gas within the battery module by determining whether the sensor signal indicates that a concentration of gas is greater than a threshold.

In some embodiments, the battery management circuitry is configured to determine a first battery module condition when the sensor signal indicates that a concentration of gas is greater than a first threshold and determine a second battery module condition when the sensor signal indicates that a concentration of gas is greater than a second threshold greater than the first threshold.

In some embodiments, the system further comprises a temperature sensor and the battery management circuitry is configured to receive a temperature sensor signal from the temperature sensor and determine a battery module condition based on the sensor signal and the temperature sensor signal.

In some embodiment of the present disclosure, a battery monitoring method is provided. The method includes receiving a sensor signal from a gas sensor configured to detect the presence of gas within a battery module, where the battery module comprises a plurality of battery cells. The method further includes determining, using battery management circuitry, whether the sensor signal indicates the presence of gas within the battery module and in response to determining that the sensor signal indicates the presence of gas, taking an action. In some embodiments, the action comprises the actions discussed above.

In some embodiments, the method further includes doping a component of the battery module with a chemical, wherein when the temperature of the component increases above an activation temperature, the component begins to off-gas the chemical. The method further includes detecting the chemical using the gas sensor. In some embodiments, the component comprises an adhesive and the method further includes using the adhesive to secure the plurality of battery cells in the battery module.

In some embodiments, the method comprises receiving first and second sensor signals from first and second gas sensors. In some embodiments, the first gas sensor is configured to detect at least one chemical that is indicative of overheating of a battery cell and the second gas sensor is configured to detect at least one chemical that is indicative of battery cell ventilation. In some embodiments, the first gas sensor is configured to detect at least one chemical that is indicative of battery cell ventilation and the second gas sensor is configured to detect at least one chemical that is indicative of a battery cell thermal runaway event.

In some embodiments, the determining whether the sensor signal indicates the presence of gas within the battery module comprises determining whether the sensor signal indicates that a concentration of gas is greater than a threshold.

In some embodiments, determining whether the sensor signal indicates the presence of gas within the battery module comprises determining a first battery module condition when the sensor signal indicates that a concentration of gas is greater than a first threshold and determining a second battery module condition when the sensor signal indicates that a concentration of gas is greater than a second threshold greater than the first threshold. In some embodiments, taking the action comprises taking a first action in response to determining the first battery module condition and taking a second action in response to determining the second battery module condition.

In some embodiments, the method further includes receiving a temperature sensor signal from a temperature sensor and determining a battery module condition based on the sensor signal and the temperature sensor signal.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

DETAILED DESCRIPTION

In accordance with the present disclosure, a gas sensor is provided in a battery module to determine the battery module status. In some embodiments, the gas sensor is used to determine the temperature of the battery cells. In some embodiments, the gas sensor is used to predict a battery cell ventilation event. In some embodiments, the gas sensor is used to detect the occurrence of a battery cell ventilation. In some embodiments, the gas sensor is used to predict the occurrence of a thermal runaway. In some embodiments, the gas sensor is used to detect the occurrence of a thermal event.

A battery cell ventilation is a dangerous event, which can potentially lead to explosions and fire, which can then propagate to other nearby battery cells. In electric vehicle design, it is important to prevent battery cell ventilation by mechanical design and software controls. If these mechanisms are not sufficient, it is useful to detect a ventilation event in order to, for example, warn the driver and safely shut down vehicle power.

Tests were performed to analyze the conditions inside of a battery module when a battery cell was purposefully overheated to induce cell ventilation. The overheating of a battery cell was accomplished using a nichrome wire. Gas sensors were included inside of the battery module enclose. A review of the test data showed, for example, a steady increase in detected gas concentration up to 20 minutes before the heated battery cell actually vented. Lithium-ion battery cells vent at around 130 degrees C. As the test progressed, the cell was heated from ambient up to 130 degrees C., and the gas concentration noticeably increased between 100 degrees C. and 130 degrees C.

It is believed that either the battery cell was releasing a gas prior to full ventilation or that something in thermal contact with the battery cell was releasing a gas. Gas can be released, for example, when a material melts or when a material is heated up and begins to off-gas.

Figure 1:
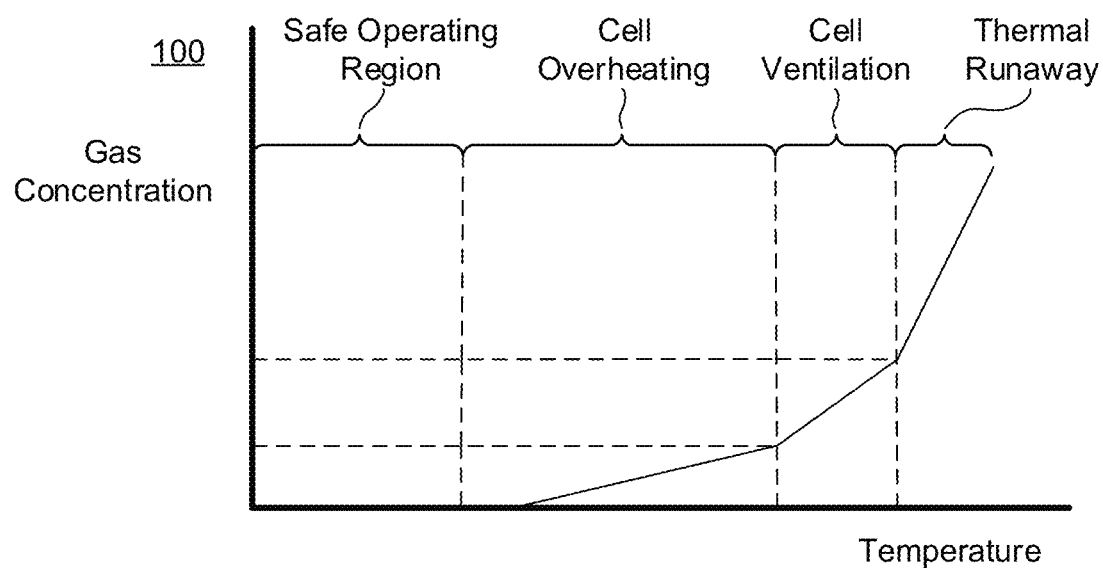
FIG. 1 shows an illustrative plot of gas concentration in a battery module in accordance with some embodiments of the present disclosure.

FIG. 1 shows an illustrative plot 100 of gas concentration in a battery module in accordance with some embodiments of the present disclosure. Plot 100 is a simplified plot showing gas concentration as the temperature of a battery cell increases. Plot 100 is divided into four temperature regions as illustrated. The first temperature region is the safe operating region. In this region, the temperature of the battery cell is in its normal operating region. As shown, the gas concentration is negligible. The second temperature region is the cell overheating region. In this region, the temperature of the battery cell is higher than its normal operating temperature. At the low end of the cell overheating region, the gas concentration may still be negligible. As the battery cell temperature increases in the cell overheating region, the gas concentration starts to increase at a relatively low rate until the temperature reaches the cell ventilation region. In the cell ventilation region, the pressure inside of the battery cell exceeds the activation pressure of its vent and the battery cell begins to vent gas and/or liquid into the battery module. As shown, the gas concentration increases at a higher rate in the cell ventilation region. The last temperature region is the thermal runaway region. In this region, the overheating of the battery cell causes damage to the internal structure of battery, which cause a short circuit. This then causes a fire and potentially an explosion. In this region, the battery cell temperature and the gas concentration in the battery module increase very quickly.

It will be understood that the specific temperature regions and gas concentrations for a battery module will be determined based on the specific battery cells used and the overall design of the battery module. For example, different types of batteries undergo ventilation and thermal runaway at different temperatures. As another example, the internal volume of the battery module will affect the gas concentration level. It will also be understood that battery modules can be designed achieve a desired relationship between battery cell temperature and gas concentration. For example, in some battery modules, an adhesive is used to secure the battery cells inside of the battery module. The adhesive may be in direct contact with the battery cell and some adhesives release volatile organic compounds (VOCs) when the adhesive is heated above a certain temperature. For example, an adhesive may begin to off-gas vapor at about 100 degrees C., which is lower than the battery cell ventilation temperature. Accordingly, an adhesive can be selected to provide advance warning of a potential battery cell ventilation. Such an advance warning enables one or more actions to be taken to prevent damage to the battery cells.

In some embodiments, materials can be added to the battery module to obtain a desired relationship between gas concentration and battery cell temperature. For example, one or more components (e.g., an adhesive) of the battery module can be doped with a chemical such that when the temperature of the component increases above an activation temperature, the component begins to off-gas the chemical such that it can be detected with a gas sensor. As another example, a component can be added to the battery module to begin off-gassing at a desired temperature. Such a component (e.g., a gel or adhesive) can be added to the outside of battery cells to enable accurate identification of localized overheating.

In some embodiments, by detecting specific chemical signatures (e.g., using an appropriately matched gas sensor substrate) and measuring their concentrations, the concentrations can be correlated to one or more specific temperature points. Therefore, a single sensor can provide full coverage for all cells in a battery module. For example, a battery module can be modeled or designed to enable the gas concentration measured by a single sensor to be correlated to one or more desired battery cell temperatures.

Figure 2:
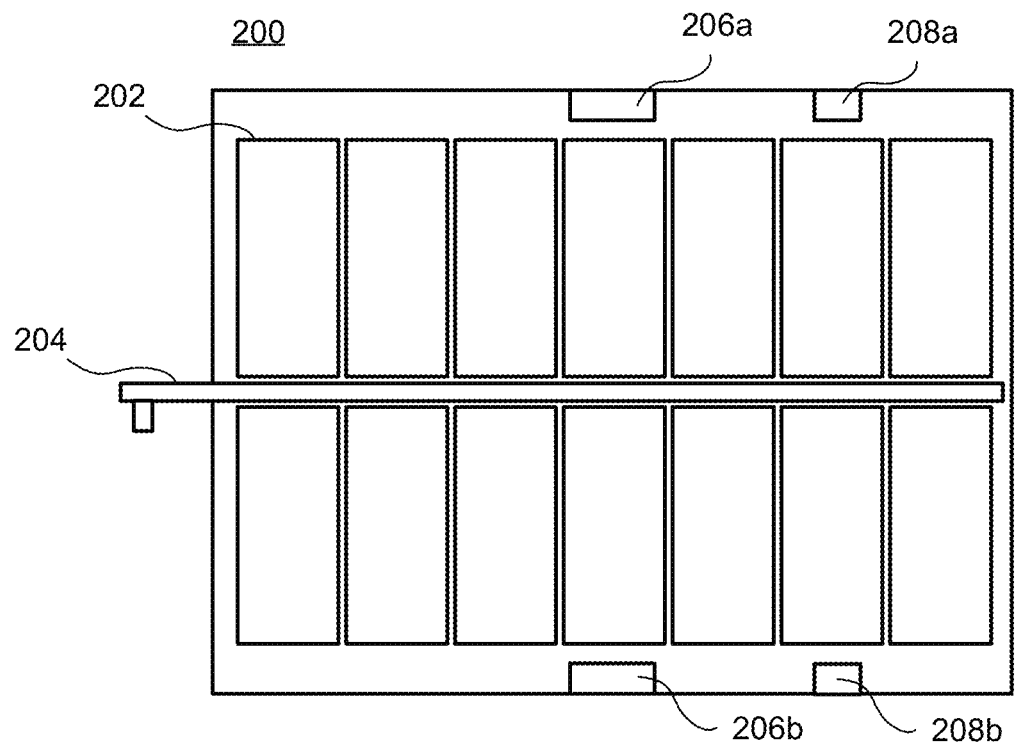
FIG. 2 shows a block diagram of an illustrative battery module 200 in accordance with some embodiments of the present disclosure.

FIG. 2 shows a block diagram of an illustrative battery module 200 in accordance with some embodiments of the present disclosure. Battery module 200 includes a plurality of battery cells 202 arranged in two layers with a cooling plate 204 positioned between the layers. In some embodiments, the ends of battery cells 202 are secured to cooling plate 204 via adhesive. The adhesive can provide a good physical and thermal coupling between battery cells 202 and cooling plate 204. Cooling plate 204 extends beyond the outer housing of battery module 200 on one side and includes input and output ports. A cooling system, not shown in FIG. 2, provides a supply of cooling fluid to the input port of cooling plate 204 and receives a return of the cooling fluid from the output port. The flow rate and/or temperature of the cooling fluid is controlled by the cooling system. The cooling system maintains the temperature of battery cells 202 in a normal operating temperature range during operation.

Battery module 200 also includes gas sensors 206a and 206b and temperature sensors 208a and 208b. Gas sensors 206a and 206b can be any suitable gas sensors for detecting gases that are emitted when the temperature of one or more of battery cells 202 increases beyond its normal temperature range. As shown, gas sensor 206a is positioned at the top of the battery module. In some embodiments, this position is preferred because hot air rises and gases emitted due to overheating are also expected to rise. This position may enable gas to be detected quicker than other positions. As shown, gas sensor 206b is positioned at the bottom of the battery module. In some embodiments, the positioning of cooling plate 204 may make this position preferred in the bottom half of the battery module. While hot air rises, cooling plate 204 will cool off the air at the top of the bottom half of the battery module and cause a convection current to occur, thereby moving emitted gas past gas sensor 206b. Temperature sensors 208a and 208b can be positioned at any suitable locations for measure temperature within battery module 200. While a temperature sensor may not be able to immediately detect a localized temperature increase in a battery cell, it may detect such an increase if the localized temperature increase persists. Therefore, the gas concentration and one or more temperature readings can be used together to determine the condition of the battery module. It will be understood that the design and layout of battery module 200 is merely illustrative and the sensors can be positioned at any suitable positions. In some embodiments, one or more guides can be used to direct the flow of hot gas towards the location of the gas sensor or gas sensors. It will also be understood that while battery module 200 is shown with two layers of battery cells 202, more or less layers of battery cells can be used. It will also be understood that more or less gas and temperature sensors can be used. In some embodiments, a battery module includes a single layer of battery cells and a single gas sensor.

Figure 3:
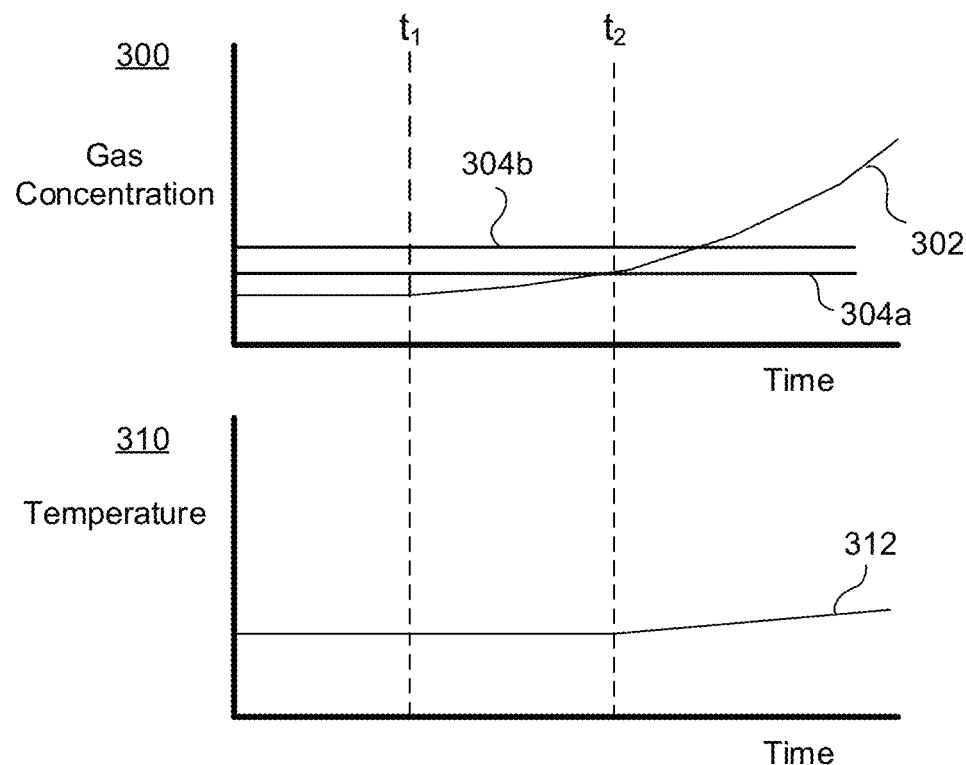
FIG. 3 shows illustrative plots of gas concentration and temperature in a battery module in accordance with some embodiments of the present disclosure.

FIG. 3 shows illustrative plots of gas concentration and temperature in a battery module in accordance with some embodiments of the present disclosure. Plot 300 is a simplified plot showing gas concentration 302 over time in the battery module. Plot 310 is a simplified plot showing temperature 312 over time in the battery module. The time axes of plots 300 and 310 are aligned and correspond to the same time. Before time $t_1$, gas concentration 302 and temperature 312 remain at relatively constant levels and this may correspond to the battery module operating in a normal operating region. Between time $t_1$ and time t2, gas concentration 302 starts to increase while temperature 312 remains at its constant level. During this time interval, the battery module may begin experiencing a battery cell overheat condition, but before the overheating is reflected at the temperature sensor. At time t2, temperature 312 also starts to increase and thus both gas concentration 302 and temperature 312 are increasing after time t2. This may correspond to the battery cell overheat condition persisting or getting worse.

Plot 300 depicts two thresholds, lower threshold 304a and upper threshold 304b. In some embodiments, when gas concentration 302 crosses upper threshold 304 a battery module condition (e.g., a battery overheat event) may be declared. For example, upper threshold 304 may be selected such that when gas concentration 302 crosses this threshold, a battery module condition can be declared with high confidence. In some embodiments, by using temperature 312 in combination with gas concentration 302, a battery module condition can be detected with high confidence sooner. For example, when the gas concentration 302 crosses lower threshold 304a, but is below upper threshold 304b, temperature 312 can be analyzed to determine whether to declare a battery module condition with high confidence. In some embodiments, a change in temperature or a comparison of the temperature level to a threshold can be used in combination with gas concentration 302. For example, a battery module condition can be declared when gas concentration 302 crosses a threshold (e.g., lower threshold 304a) and one of the following conditions is met: (1) the slope of temperature 312 is positive, (2) the slope of temperature 312 is greater than a threshold, (3) temperature 312 is greater than a threshold, or a combination thereof.

As explained above, a gas sensor can be any suitable gas sensor for detecting gases that are emitted when the temperature of a battery cell increases beyond its normal temperature range. Such a gas sensor may detect (a) off-gassing from an adhesive when a battery cell is in an overheating condition, (b) gases that vent out of the battery cell during ventilation, and (c) gases that are emitted during thermal runaway. In some embodiments, multiple differently tuned gas sensors are used to detect different types of gases. A first gas sensor may be used to detect off-gassing from an adhesive (e.g., an adhesive doped with a chemical). A second gas sensor may be used to detect gases emitted during cell ventilation and thermal runaway (e.g., CO, $CO_2$, and $H_2$). A third gas sensor may be used to detect gases emitted during cell ventilation and thermal runaway. In some embodiments, a single gas sensor may be configured to separately detect different types of gas.

In some embodiments, one or more gas concentration thresholds may be used to determine a battery module condition. For example, a threshold may be set to identify when the battery module enters a battery cell overheating region, but before the battery cell reaches ventilation. Such a threshold may be set at a level below the bottom horizontal dashed line in FIG. 1. When the gas concentration is below the threshold, the battery module condition is determined to be normal. When the gas concentration is above the threshold, the battery module condition is determined to be in a battery cell overheating condition and this predicts the onset of cell ventilation. A second higher threshold may be used to identify when cell ventilation occurs. For example, such a threshold may be set at a level between the two horizontal dashed lines in FIG. 1. When the gas concentration is above the second higher threshold, the battery module condition is determined to be in cell ventilation condition and this predicts the onset of a thermal runaway event. A third higher threshold may be used to identify when a thermal runaway event occurs. Such a threshold may be set at a level above the higher horizontal dashed line in FIG. 1.

In some embodiments, the gas concentration in a battery module may vary during normal operation of the battery module. For example, the gas concentration may gradually increase the longer a battery module is operated. As another example, the gas concentration may also increase under heavy loads. Accordingly, the usage and condition of the battery module can be monitored and the thresholds can be adjusted as a function of usage. For example, if the gas concentration is expected to gradually increase during continuous operation of a battery module, the one or more thresholds can also be gradually increased. As another example, when a battery module is not in use, the gas concentration in the battery module is expected to decrease over time. Accordingly, the one or more thresholds can be reduced based on the last reading of gas concentration and how long the battery module has not been in use. By adjusting the one or more thresholds based on the operating condition of the battery module, false positives can be eliminated. The expected normal change in gas concentration can be determined by operating the battery module under a range of normal operating conditions and observing the changes in gas concentration.

Figure 4:
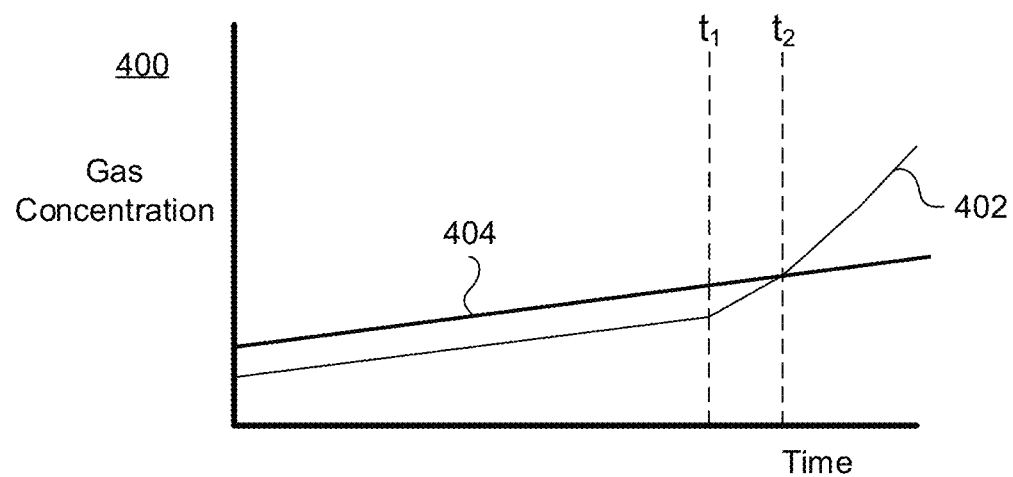
FIG. 4 shows an illustrative plot of gas concentration in a battery module and an adjustable threshold in accordance with some embodiments of the present disclosure.

FIG. 4 shows an illustrative plot 400 of gas concentration 402 in a battery module and an adjustable threshold 404 in accordance with some embodiments of the present disclosure. Plot 400 is simplified plot showing gas concentration 402 over time as the battery module is under a load (e.g., a relatively constant load). As shown, threshold 404 varies over time and is therefore adjustable based on the operating condition of the battery module. In some embodiments, battery management circuitry is used to determine the adjustable threshold. For example, the adjustable threshold can be determined by first calculating the expected gas concentration in the battery module based on the load over time and information about how the battery module is expected to operate under the load and then adding an offset (e.g., a fixed amount or a percentage amount). In FIG. 4, threshold 404 increases linearly over time under the relatively constant load. By using an adjustable threshold (e.g., based on expected gas concentration), a battery overheat event can be predicted or identified quickly. The gas concentration 402 in the battery module increases linearly before time $t_1$ as expected. However, at time $t_1$ the gas concentration 402 begins to increase at a faster rate indicating that a battery overheat condition may be about to occur. At time t2, the gas concentration 402 crosses the adjustable threshold 404. At this point, the battery management circuitry may declare a battery module condition (e.g., a battery overheat event) and take one or more actions as described herein.

The battery module of the present disclosure, such as battery module 200 of FIG. 2, can be used in various applications. For example, the battery modules can be used for grid energy storage. As another example, the battery modules can be used in an electric vehicle.

Figure 5:
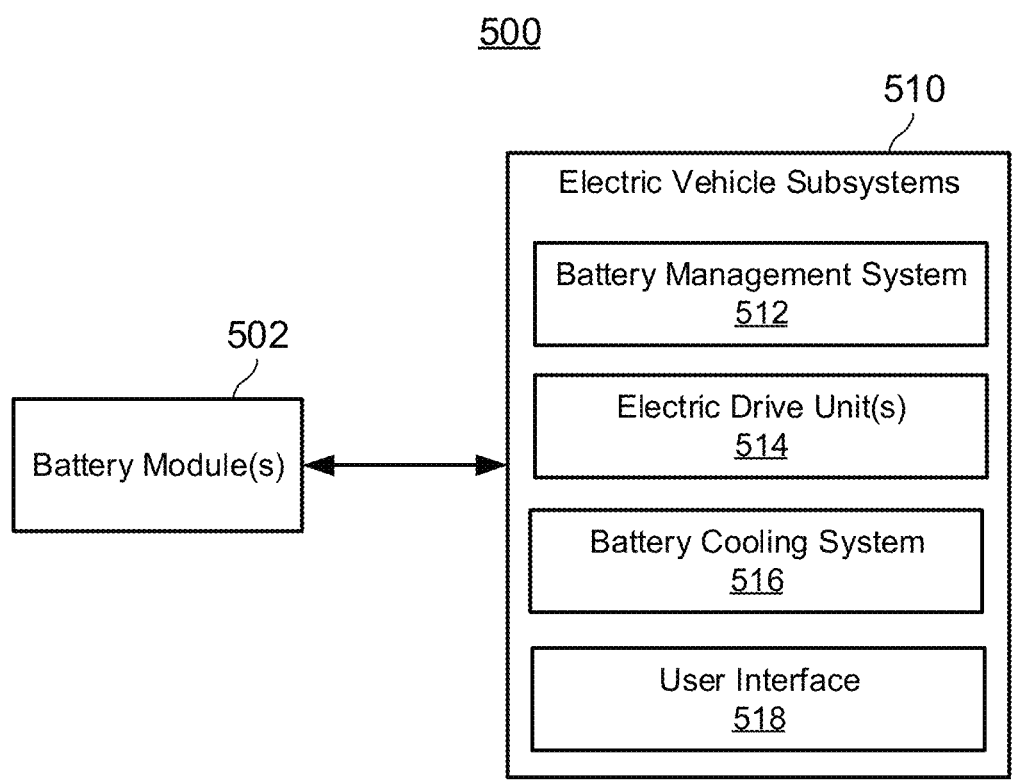
FIG. 5 shows a system diagram of an illustrative battery system 100 for use in an electric vehicle in accordance with some embodiments of the present disclosure.

FIG. 5 shows a system diagram of an illustrative battery system 500 for use in an electric vehicle in accordance with some embodiments of the present disclosure. Battery system 500 includes one or more battery modules 502 coupled to electric vehicle subsystems 510. In some embodiments, each of the one or more battery modules 502 includes multiple battery cells. In some embodiments, the one or more battery modules 502 each correspond to battery module 200 of FIG. 2. The electric vehicle subsystems depicted in FIG. 3 are exemplary and additional or less subsystems may be included in the electric vehicle. It will be understood that the electric vehicle subsystems may comprise circuitry for performing functions. In some embodiments, the circuitry may comprise hardware (e.g., one or more ASICs) or a combination of hardware and software (e.g., one or more hardware CPUs for executing software instructions stored in memory), or a combination thereof. As shown, the electric vehicle subsystems include a battery management system 512, one or more electric drive units 514, a battery cooling system 516, and a user interface 518.

The battery management system 512 monitors and controls the operation of the battery modules 502. The battery management system 512 receives sensor signals from the battery modules 502. In some embodiments, the battery management system 512 receives sensor signals from gas sensors (e.g., gas sensor 206a and 206b of FIG. 2). In some embodiments, the battery management system 512 receives sensor signals from gas sensors and temperature sensors (e.g., temperature sensors 208a and 208b of FIG. 2). The battery management system 512 (e.g., battery management circuitry) evaluates the sensor signals and determines the condition of the battery modules. When the condition of a battery module is outside of its normal operating condition, the battery management system 512 may take one or more actions.

The battery cooling system 516 provides cooling to the one or more battery modules 502. In some embodiments, the battery cooling system 516 independently provides cooling fluid to each battery module. The battery management system 512 is configured to control the battery cooling system 516 to maintain the one or more battery modules 502 in a normal temperature range.

The one or more electric drive units 514 provide propulsion to the electric vehicle. When an electric vehicle is accelerated quickly, the one or more electric drive units 514 provide a large load on the one or more battery modules 502. This can cause an increase in temperature in the battery modules. The battery management system 512 can respond to the large load by causing the battery cooling system 516 to provide increased cooling to the battery modules 502. For example, the coolant flow rate can be increased and/or the coolant temperature can be decreased to remove the heat generated by the large load.

The user interface 518 can be any suitable user interface. In some embodiments, the user interface comprises a display screen (e.g., an instrument panel display). The display screen can be an LCD display, an OLED display, and LED display or any other type of display. In some embodiments, the user interface comprises a speaker. The user interface can operate under the control of the battery management system 512 to present information (e.g., visual and/or audio information) to the user.

In accordance with the present disclosure, the battery management system 512 may use one or more gas sensors to correlate gas concentration to battery cell temperature. By monitoring the gas concentration, the battery management system 512 is able to determine, as explained above, what temperature region the battery cells are operating within (e.g., a safe operating region, a cell overheating region, a cell ventilation region, or a thermal runaway region). In some embodiments, battery management circuitry is configured to receive a sensor signal from a gas sensor, determine whether the sensor signal indicates the presence of gas within a battery module (e.g., by comparing the sensor signal to one or more thresholds as described above in connection with FIGS. 1, 3, and 4), and take an action in response to determining that the sensor signal indicates the presence of gas. In some embodiments, the battery management circuitry adjusts the threshold based on the usage of the battery module. When the presence of gas indicates that a battery module is in a cell overheating condition, this predicts the onset of cell ventilation. Such a determination, depending on the cause of the cell overheating, may provide sufficient time (e.g., several minutes or up to 20 minute or more) to prevent ventilation from occurring.

The battery management circuitry may take one or more actions to prevent ventilation from occurring. For example, the battery management circuitry may perform one or more of the following actions: increase cooling (e.g., by instructing the battery cooling system to increase cooling); decreasing current flow in the battery module (e.g., by limiting the maximum load that can be applied to the battery module); providing a warning to the user (e.g., using the user interface to display a warning or sound an alarm); and disconnecting the battery module (e.g., by activating a contactor coupled to an electrical output of the battery module). In some embodiments, the battery management circuitry may progressively take actions if the gas concentration continues to increase. For example, the battery management circuitry may first increase cooling. If the gas concentration continues to increase, the battery management circuitry may additionally decrease the current flow in the battery module. If the gas concentration continues to increase, the battery management circuitry may display a warning to the user. If the gas concentration continues to increase, the battery management circuitry may disconnect the battery module to shut down the vehicle. In some embodiments, the battery management circuitry may take one or more first actions when the battery cells are operating within the cell overheating region (e.g., to try to prevent cell ventilation) and may take one or more second actions when the battery cells are operating within the cell ventilation region (e.g., to try to prevent thermal runaway). The battery management circuitry may take one or more third actions (e.g., disconnecting the battery) when the battery cells are operating within the thermal runaway region.

It will be understood that the battery management circuitry may evaluate the gas concentration of a single gas sensor or the concentration of multiple gas sensors, each configured to detect a different type of gas, to determine what temperature region the battery cells are operating within. It will also be understood that the battery management circuitry may receive one or more additional sensor signals (e.g., a temperature sensor signal or a pressure sensor signal) to evaluate additional information to determine the temperature of the battery cells. For example, if a battery cell is slowly overheating, the gas concentration may first begin to increase, then the temperature reading of a temperature sensor may begin to increase, and then the pressure reading from a pressure sensor may begin to increase after ventilation or thermal runaway (e.g., a large pressure increase may occur after ventilation and again after a thermal runaway). Accordingly, by using information from one or more additional sensors, the battery management circuitry is able to more accurately determine the temperature of the battery cells and more accurately predict the onset of cell ventilation or a thermal runaway. For example, if the gas concentration is increasing at a slow rate and crosses a threshold, the battery management circuitry may not determine that the battery cells are operating in a cell overheating region unless a temperature reading also shows an increase in temperature. However, if there is a relatively fast increase (e.g., a high rate of change) in gas concentration, the battery management circuitry may determine that the battery cells are operating in the cell overheating region regardless of whether a temperature reading shows an increase in temperature. Accordingly, the battery management circuitry can use both the gas concentration and the change in gas concentration to determine a battery module condition.

It will also be understood that the techniques of the present disclosure can correlate the concentration of a detected gas (e.g., released from an adhesive) measured by a single gas sensor to the temperature of that material. By proxy, the techniques of the present disclosure also enable the concentration to be correlated to battery cell temperature. Accordingly, battery cell temperature can be determined based on the presence of gas in the battery module (e.g., when a material is configured to off-gas at a particular temperature) or concentration of gas in the battery module (e.g., based on empirical data correlating battery cell temperature to gas concentration).

The techniques of the present disclosure provide various improvements to the design and operation of battery modules. In a battery module, unless every single cell in the module has its own temperature sensor measurement, there will always be incomplete temperature sensing coverage. For battery modules with a large number of battery cells, it is impractical to provide each battery cell with its own temperature sensor. When not every battery cell has its own temperature sensor, battery cell temperature measurements are inferred or modeled and it is difficult or impossible to detect localized or single cell temperature increases that precede cell ventilation. The use of the gas sensor of the present disclosure overcomes these problems and provides an early warning of the onset of cell ventilation, thereby enabling actions to be taken to reduce the likelihood of cell ventilation and thermal runaway.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A system, comprising:
a battery module comprising:
a plurality of battery cells;
a component thermally coupled to the plurality of battery cells, wherein the component is configured to release a gas when a temperature of the component increases above an activation temperature lower than a cell ventilation temperature range, wherein the cell ventilation temperature range causes at least one battery cell of the plurality of battery cells to begin venting; and
a gas sensor configured to detect the presence of the gas within the battery module; and
battery management circuitry configured to:
receive a sensor signal from the gas sensor;
determine whether the sensor signal indicates the presence of the gas within the battery module; and
in response to determining that the sensor signal indicates the presence of the gas, take an action.

2. The system of claim 1, further comprising:
a battery cooling system configured to provide cooling to the plurality of battery cells, wherein the action comprises using the battery cooling system to provide increased cooling to the plurality of battery cells.

3. The system of claim 1, wherein the action comprises one of limiting a maximum load that can be applied to the battery module and disconnecting the battery module from a load.

4. The system of claim 1, further comprising:
a user interface, wherein the action comprises using the user interface to provide a warning.

5. The system of claim 1, wherein:
the component was doped with a chemical;
when the temperature of the component increases above the activation temperature, the component begins to off-gas the gas from the chemical.

6. The system of claim 5, wherein the component comprises an adhesive used to secure the plurality of battery cells in the battery module.

7. The system of claim 1, wherein the gas sensor is a first gas sensor, the battery module further comprising:
a second gas sensor configured to detect at least one chemical that is indicative of battery cell ventilation.

8. The system of claim 1, wherein the gas sensor is a first gas sensor, the battery module further comprising:
a second gas sensor configured to detect at least one chemical that is indicative of a battery cell thermal runaway event.

9. The system of claim 1, wherein the battery management circuitry is configured to determine whether the sensor signal indicates the presence of the gas within the battery module by:
determining whether the sensor signal indicates that a concentration of the gas is greater than a threshold.

10. The system of claim 1, wherein the battery management circuitry is configured to:
determine a first battery module condition when the sensor signal indicates that a concentration of the gas is greater than a first threshold; and
determine a second battery module condition when the sensor signal indicates that a concentration of the gas is greater than a second threshold greater than the first threshold.

11. The system of claim 1, further comprising:
at least one temperature sensor, wherein:
the battery management circuitry is configured to:
receive at least one temperature sensor signal from the at least one temperature sensor; and
determine a battery module condition based on the sensor signal and the at least one temperature sensor signal.

12. A method, comprising:
releasing a gas, from a component thermally coupled to a plurality of battery cells, when a temperature of the component increases above an activation temperature lower than a cell ventilation temperature range, wherein the cell ventilation temperature range causes at least one battery cell of the plurality of battery cells to begin venting;
receiving a sensor signal from a gas sensor configured to detect the presence of the gas within a battery module, wherein the battery module comprises the plurality of battery cells;
determining, using battery management circuitry, that the sensor signal indicates the presence of the gas within the battery module; and
in response to determining that the sensor signal indicates the presence of the gas, taking an action.

13. The method of claim 12, wherein taking the action comprises providing increased cooling to the plurality of battery cells using a battery cooling system.

14. The method of claim 12, wherein taking the action comprises one of limiting a maximum load that can be applied to the battery module and disconnecting the battery module from a load.

15. The method of claim 12, wherein taking the action comprises using a user interface to provide a warning.

16. The method of claim 12, further comprising:
doping the component of the battery module with a chemical, wherein when the temperature of the component increases above the activation temperature, the component begins to off-gas the gas from the chemical.

17. The method of claim 16, wherein the component comprises an adhesive, the method further comprising:
using the adhesive to secure the plurality of battery cells in the battery module.

18. The method of claim 12, wherein the gas sensor is a first gas sensor, the method further comprising:
receiving a second sensor signal from a second gas sensor configured to detect at least one chemical that is indicative of battery cell ventilation.

19. The method of claim 12, wherein the gas sensor is a first gas sensor, the method further comprising:
receiving a second sensor signal from a second gas sensor configured to detect at least one chemical that is indicative of a battery cell thermal runaway event.

20. The method of claim 12, wherein determining whether the sensor signal indicates the presence of the gas within the battery module comprises determining whether the sensor signal indicates that a concentration of the gas is greater than a threshold.

21. The method of claim 12, wherein:
determining whether the sensor signal indicates the presence of the gas within the battery module comprises:
- determining a first battery module condition when the sensor signal indicates that a concentration of the gas is greater than a first threshold; and
- determining a second battery module condition when the sensor signal indicates that a concentration of the gas is greater than a second threshold greater than the first threshold; and taking the action comprises:
- taking a first action in response to determining the first battery module condition; and
- taking a second action in response to determining the second battery module condition.

22. The method of claim 12, further comprising:
receiving at least one temperature sensor signal from at least one temperature sensor; and
determining a battery module condition based on the sensor signal and the at least one temperature sensor signal.

\* \* \* \* \*